April 1, 1952     D. T. IMLER     2,591,358

THERMOCOUPLE BRIDGE

Filed Jan. 21, 1947

INVENTOR.
DONALD T. IMLER
BY
*Donald W. Farrington*
ATTORNEY

Patented Apr. 1, 1952

2,591,358

UNITED STATES PATENT OFFICE 2,591,358

THERMOCOUPLE BRIDGE

Donald T. Imler, Gettysburg, Pa., assignor to The Glenn L. Martin Company, Middle River, Md., a corporation of Maryland Application January 21, 1947, Serial No. 723,234

4 Claims. (Cl. 73—359)

This invention relates to an apparatus for detecting, measuring, and/or amplifying the small direct current voltages generated by the conventional bimetal thermocouple used for the measurement of high temperatures.

A thermocouple generates a small direct current voltage that is difficult to measure without delicate precision instruments under laboratory conditions. It would be impossible to use ordinary methods of detecting and measuring thermocouple voltages in telemetering systems. For example, in experimental work with guided missiles or rockets, it is necessary, among other things, to determine and relay back to the ground control stations temperatures in various components of the missile. Thermocouples may be used to measure the temperature but obviously a more rugged installation than a microammeter must be employed to interpret the voltages developed by the thermocouple. Even if it were possible to measure accurately the direct current voltage generated by the thermocouple, some other equipment would be necessary to translate the direct current into a signal that could be transmitted in a telemetering system to the ground control station.

It is an object of this invention to provide a bridge circuit into which the output of the thermocouple may be fed to produce an alternating voltage signal proportional to the thermocouple voltage.

It is another object of this invention to make use of semi-conductors or rectifiers connected in a bridge circuit to give a maximum unbalance of the bridge and therefore the greatest possible output signal from the bridge in response to the unbalance caused by the thermocouple voltage.

It is another object of this invention to provide a bridge circuit employing semi-conductors or rectifiers as well as all other circuit elements, of simple, rugged construction having small masses.

It is a further object of this invention to provide a bridge circuit including germanium crystal diodes to detect the small D. C. voltage output of a thermocouple and, at the same time. convert the D. C. signal to an A. C. or pulsed current signal. The latter is desirable for ease of transmission of the signal in a telemetering system.

The phenomena utilized in this invention to get a substantial ratio change of the bridge circuit in response to increased temperatures, centers around a property of a few metal oxides and some metals with slight impurities, namely, those that exhibit highly polarized non-linear characteristics. Metals known as semi-conductors are often used for their current rectifying properties. Copper oxide and selenium rectifiers exhibit somewhat this characteristic, but germanium crystals have been developed that are commercially available in compact units which will withstand relatively high voltages and exhibit to a marked degree the semi-conductor properties. The commercial development of the germanium crystal rectifier, commonly referred to as a germanium crystal diode, has disclosed that this element has several peculiar properties that render it a very versatile element for electric circuit use. They are small and of compact, rugged construction which renders them suitable to industrial uses.

The particular property of such semi-conductors which is utilized in this invention is the front-back resistance ratio. When current is passed through the semi-conductors in one direction, a value of resistance for the crystal can be determined from the voltage and current ratio and it may be, for example, 100 ohms. When the current is applied in the opposite direction on the same semi-conductor, the value of the resistance may be found to be in the order of 10 ohms. The effective resistance can be changed by passing a small current in the proper direction through the semi-conductor.

In the present invention this effect is utilized in a bridge circuit to detect the effect of the thermocouple voltage and to convert the thermocouple voltage to an A. C., or pulsed, signal for use in a telemetering system. The invention can best be understood when taken in connection with the accompanying drawings, in which.

Figure 2:
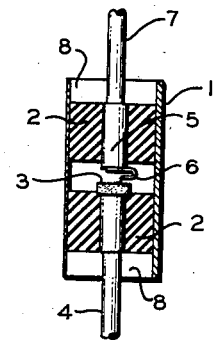
Figure 2 is a sectional view through a typical crystal or semi-conductor.

While the crystal or the diode may comprise metal oxides or some metals with slight impurities which exhibit the characteristics of a semi-conductor, it is preferred that the crystal diode be formed from a combination of germanium with a slight amount of tin. As shown in Figure 2, a tubular casing 1 has an insulating plug or block 2 in which a germanium crystal is mounted. Lead wire 4 extends through the insulator to electrically connect the germanium crystal 3 in the circuit. Member 5 supports a conventional fine platinum wire, or whisker 6 electrically connected in the circuit by lead wire 7. The ends of the casing 1 are sealed with a wax as shown at 8. This is a conventional mounting for crystals or diodes of this type. The commercial embodiment of this unit is approximately ½" long and ¼"

in diameter. It is manufactured by Sylvania Electric Products, Inc., Boston, Mass., and is of the type 1N34.

Figure 3:
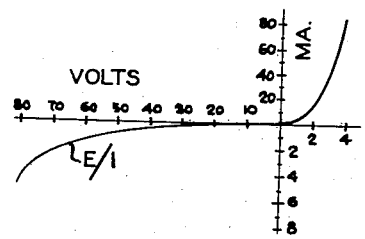
Figure 3 is a characteristic curve of the germanium crystal showing a front-back resistance phenomena.
Figure 4:
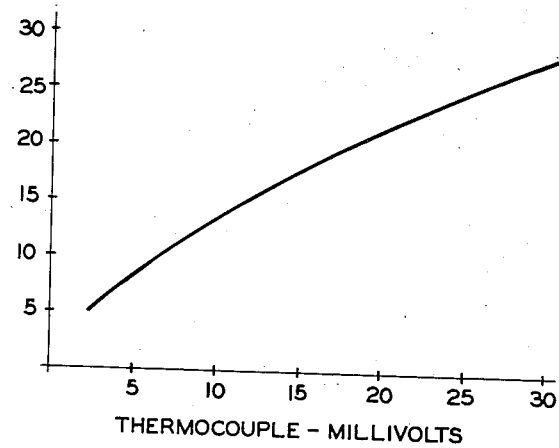
Figure 4 illustrates a characteristic output curve of the bridge shown in Figure 1.

It will be seen from a consideration of Figure 3 that when a voltage is applied in one direction a large value of current will flow through the germanium crystal diode indicating a low value of resistance. It will also be noted that when the voltage is applied in the opposite sense there is a large resistance of the element to the flow of current. It should be noted that the curves are to different scales. It is this phenomena that is utilized in the bridge circuit shown in Figure 1.

Figure 1:
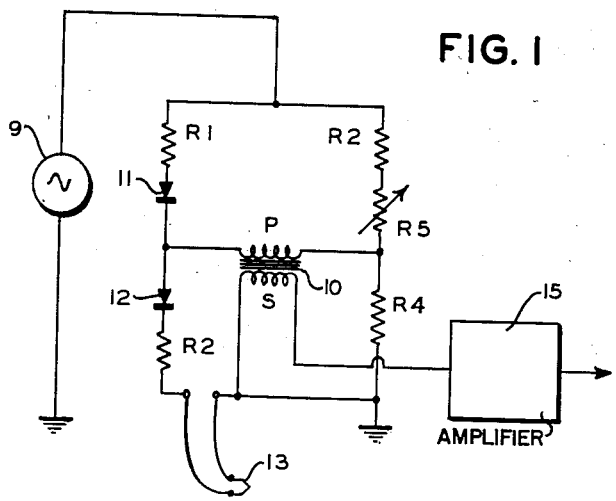
Figure 1 illustrates a bridge circuit embodying the invention.

The bridge circuit shown in Figure 1 generally conforms to the well-known Wheatstone bridge. Elements $R_1$, $R_2$, $R_3$, and $R_4$ are resistances in the arms of the bridge. $R_5$ is a variable resistance used to balance the bridge. In the arm of the bridge with $R_1$ is placed element 11 which is a germanium crystal diode. A similar diode 12 is placed in the arm of the bridge with $R_2$. In this arm, provision is made for the connection of thermocouple 13. Power supply 9 may be any source of alternating current of about 3000 cycles but in a preferred form is a source of pulsed current of similar frequency. Transformer 10 has a primary side connected between the arms of the bridge where it receives no current in the balanced condition of the bridge. The output on the secondary side may be connected to a measuring device or to amplifier 15 of an oscillograph or a telemetering system.

The bridge is balanced by variable resistance 5 when the thermocouple 8 is at room temperature. Under these conditions there will be no output signal from the secondary of transformer 10. When thermocouple 8 is subjected to heat, it generates a small D. C. voltage. This voltage generated in the arm of the bridge has the effect of decreasing or increasing the effective resistance of element 12, more than element 11, which causes a ratio change in the bridge and the secondary of transformer 10 will emit a signal which is proportional to the temperature thermocouple. Thus, a few direct current millivolts generated by the thermocouple unbalances the bridge and produces an alternating or pulsed unbalanced voltage across the arms of the bridge.

This bridge circuit for measuring the thermocouple potentials has several advantages, the most outstanding of which is that the equipment involved, namely, the crystal diodes, resistances, and transformer are extremely compact, rugged elements and therefore can be used to measure temperatures in equipment subjected to conditions not found in a precision measurement laboratory.

This bridge has a further advantage of inherently, without the use of tubes, converting a small D. C. voltage generated by the thermocouple into an A. C. signal.

It is to be understood that certain changes, alterations, modifications, and substitutions may be made without departing from the spirit and scope of the appended claims.

I claim as my invention:

1. A circuit for detecting small thermocouple voltages and converting them into proportionate alternating current voltages comprising a bridge network having a plurality of impedance arms connected together to provide spaced pairs of input and output points, means connected across said input points for supplying a pulsed current to said network, one of said network arms including a germanium crystal diode and a thermocouple connected in series, and means to detect the signal strength of the alternating current component of the voltage across said output points for an unbalanced condition of said network upon subjecting said thermocouple to heat.

2. A circuit for detecting small thermocouple voltages and converting them into proportionate alternating current voltages comprising a bridge network having a plurality of impedance arms connected together to provide spaced pairs of input and output points, means connected across said input points for supplying a pulsed current to said network, means to detect the signal strength of the alternating current component of the voltage across said output points for an unbalanced condition of said bridge, one of said bridge arms including a germanium crystal diode and a thermocouple connected in series, means to balance said bridge to bring said signal strength to a predetermined value when said thermocouple is at room temperature, said thermocouple generating a voltage upon being heated to change the impedance of said crystal to cause an unbalanced condition of said bridge, said bridge generating a voltage across the output points having an alternating current component proportional to said thermocouple voltage.

3. A circuit for producing alternating current voltage proportionate to small direct current thermocouple voltages comprising a null network having balanced impedance arms providing a pair of null points, one pair of ratio arms each containing a germanium crystal diode, means to supply a pulsed current to said network, meter means to measure the voltage generated at said null points for an unbalanced condition of said bridge, one of said bridge arms including said germanium crystal diode also including a thermocouple connected in series in said arm, means to balance said bridge when said thermocouple is at room temperature, said thermocouple generating a voltage upon being heated to change the impedance of said crystal to cause a voltage to be generated across the null points of the bridge upon the unbalanced condition of said bridge, to be proportional to the generated thermocouple voltage.

4. A circuit for measuring small thermocouple voltages comprising a null network providing a pair of null points and having a pair of ratio arms each containing a germanium crystal diode, means to supply a pulsed current to said network, one of said network arms including said germanium crystal diode also including a thermocouple connected in series, and means to measure the signal strength at said null points for an unbalanced condition of said network upon subjecting said thermocouple to heat.

DONALD T. IMLER.

REFERENCES CITED

The following references are of record in the file of this patent:

UNITED STATES PATENTS

| Number | Name | Date |
| --- | --- | --- |
| 1,727,388 | Affel | Sept. 10, 1929 |
| 2,031,050 | Leeds | Feb. 18, 1936 |
| 2,368,701 | Borden | Feb. 6, 1945 |
| 2,414,317 | Middel | Jan. 14, 1947 |

FOREIGN PATENTS

| Number | Country | Date |
| --- | --- | --- |
| 297,261 | Great Britain | Sept. 20, 1928 |